US010956353B1

(12) United States Patent
Bailey et al.

(10) Patent No.: US 10,956,353 B1
(45) Date of Patent: Mar. 23, 2021

(54) CONNECTOR CONFIGURATIONS FOR PRINTED CIRCUIT BOARDS

(71) Applicant: Amazon Technologies, Inc., Seattle, WA (US)

(72) Inventors: Kevin Bailey, Seattle, WA (US); Darin Lee Frink, Lake Tapps, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/905,334

(22) Filed: Feb. 26, 2018

(51) Int. Cl.
*G06F 13/40* (2006.01)
*G06F 1/18* (2006.01)
*G06F 13/42* (2006.01)

(52) U.S. Cl.
CPC .......... *G06F 13/4068* (2013.01); *G06F 1/185* (2013.01); *G06F 13/4282* (2013.01); *G06F 2213/0026* (2013.01)

(58) Field of Classification Search
CPC ............................................. G06F 2009/45595
See application file for complete search history.

(56) References Cited

U.S. PATENT DOCUMENTS

| | | | |
|---|---|---|---|
| 6,937,476 B1* | 8/2005 | Chen | G06F 1/184 361/732 |
| 7,058,738 B2* | 6/2006 | Stufflebeam, Jr. | G06F 13/4022 710/104 |
| 7,264,512 B2* | 9/2007 | Wolford | H01R 12/721 439/636 |
| 7,466,557 B2* | 12/2008 | Watanabe | G06F 1/181 361/752 |
| 7,868,625 B2* | 1/2011 | Burt | G06F 11/2733 324/538 |
| 2007/0211430 A1* | 9/2007 | Bechtolsheim | H05K 7/20736 361/695 |

* cited by examiner

*Primary Examiner* — Henry Tsai
*Assistant Examiner* — Juanito Borromeo
(74) *Attorney, Agent, or Firm* — Kilpatrick Townsend & Stockton LLP

(57) ABSTRACT

A printed circuit board (PCB) may be provided that includes a plurality of expansion device connectors mounted to at least two outer edges of the PCB. Each of the expansion device connectors may include a slot aligned in a same plane as the PCB. The slot may be positioned to connect to an expansion device such as to align the expansion device in the same plane as the PCB. Thus, the expansion card may be communicatively connected to the PCB via the expansion card connector. As the PCB includes expansion device connectors on at least two outer edges, the PCB may be positioned in at least two orientations to provide a greater number of expansion device configurations than realized in some PCBs.

19 Claims, 8 Drawing Sheets

CONNECTOR CONFIGURATIONS FOR PRINTED CIRCUIT BOARDS

BACKGROUND

Modern server computer hardware designs are evolving to provide shorter product development cycles, rapid scaling, and diverse product feature sets. Some server designs (e.g., cloud-based data center servers) leverage a server architecture that is built with modular hardware building blocks. Within these systems, it is important to enable efficient use of the limited available space. With the advent of new motherboard architectures, the number of possible expansion connectors may increase, which may increase the need for efficient space utilization within the modular building block. Thus, the form factor of such printed circuit boards may be improved upon so as to improve space utilization within the server and to allow for more flexibility in configuring components of the server.

BRIEF DESCRIPTION OF THE DRAWINGS

Various embodiments in accordance with the present disclosure will be described with reference to the drawings, in which.

DETAILED DESCRIPTION

Figure 1:
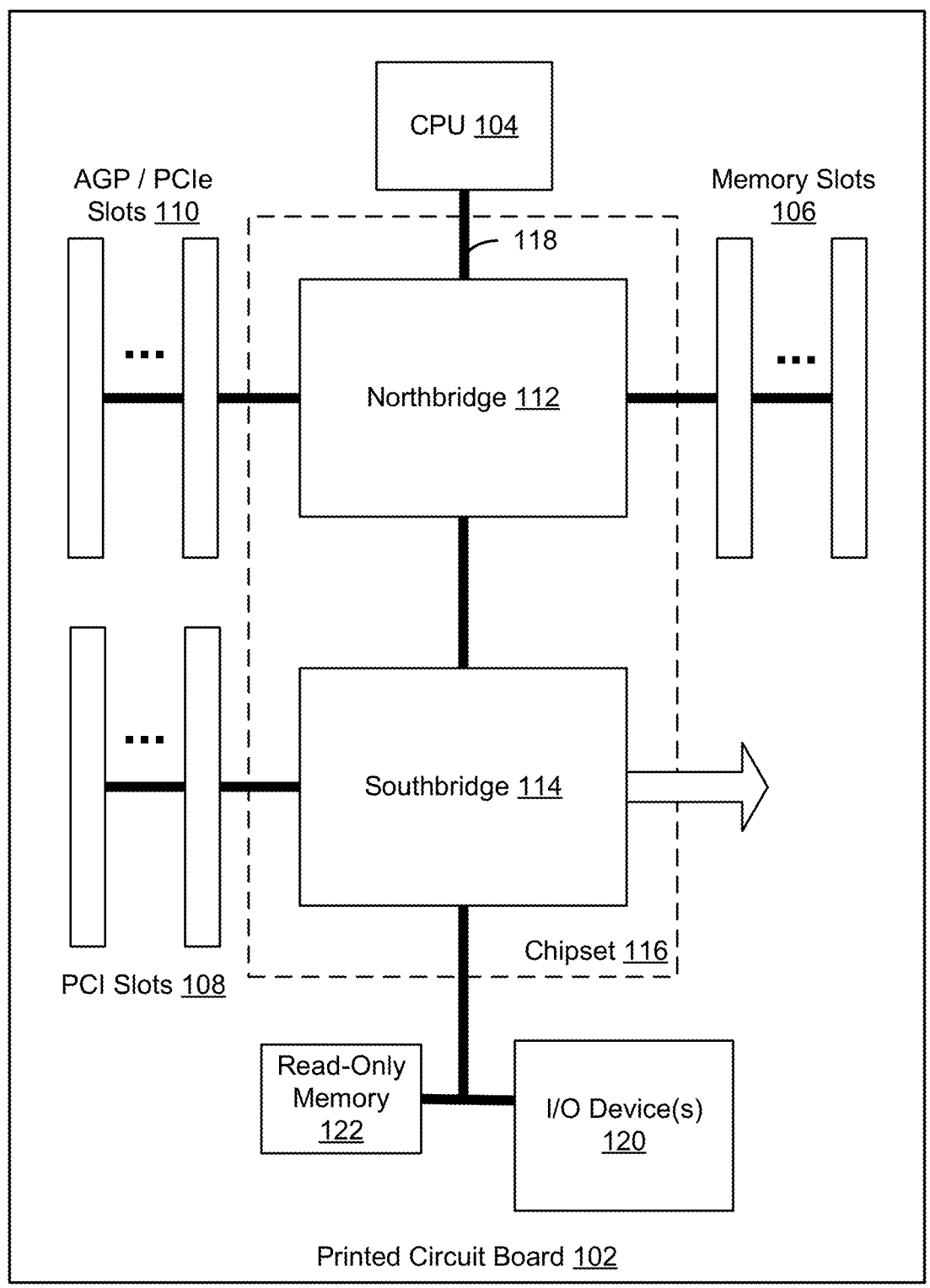
FIG. 1 is a block diagram illustrating an example computing system including a printed circuit board.

Techniques described herein are directed to an improved printed circuit board (e.g., a motherboard) design. A "motherboard" may refer to a printed circuit board (PCB) that contains various components of a computer or other device, with expansion connectors into which other printed circuit boards (e.g., expansion cards) may be slotted. An "expansion device" (also known as an "expansion card") may be a PCB that can be inserted into a motherboard to provide additional functionality and/or memory to the motherboard. Some example expansion devices may include modems, broadband modems, network interface cards/network adaptors, sound cards, video graphics cards, or the like. Although examples herein may utilize "expansion connectors" that include Peripheral Component Interconnect Express (PCIe) connectors, any suitable expansion connector such as Accelerated Graphics Port (AGP) connectors, Peripheral Component Interconnect (PCI) connectors, or the like, may be equally utilized.

In some embodiments, a PCB (e.g., a motherboard) may be provided that includes PCIe lanes that run to at least two sides (e.g., outer edges) of the printed circuit board. These PCIe lanes may connect to corresponding expansion connectors that are mounted along the side (e.g., outer edge(s)) of the printed circuit board. In some embodiments, two or more expansion connectors are mounted on the outer edges of the PCB. At least one expansion connector may be mounted on a first side of the PCB and at least one other expansion connector may be mounted on a second side that opposed the first side of the PCB. Because the PCB includes PCIe lanes and corresponding expansion connectors on multiple sides, the PCB may be rotatable, as explained in more detail below.

By way of example, the motherboard may include expansion connectors on two sides (e.g., opposite outer edges) of the motherboard (as used herein, the opposite outer edges are referred to as the "front side" and the "back side" of the motherboard). The front side and the back side of the motherboard may include the same, or a different number of expansion connectors. As a non-limiting example, the front side of the motherboard may include two expansion connectors, while the back side of the motherboard may include four expansion connectors. The motherboard may be rotatable (e.g., by 180 degrees) such that the front side of the motherboard may face either the front or the back of the rack server bay. As used herein, a "rack server bay" may be a single mounting slot in a rack server chassis, the rack server chassis containing multiple mounting slots (e.g., bays) that individually hold a corresponding hardware unit (e.g., a computing device including a motherboard and one or more expansion devices). By enabling the motherboard to be rotatable as described herein, the motherboard may be utilized to direct a larger number and/or certain types of expansion devices toward the front or back of a rack server bay. Thus, the ability to rotate the motherboard increases a number of potential expansion device configurations within the rack server bay. Accordingly, a particular number or type(s) of expansion devices may be faced toward the front or back of the server rack back for thermal regulation and/or accessibility benefits.

Some motherboards are equipped with expansion connectors that are positioned on a top face of a motherboard and arranged so that expansion cards connected to the expansion connectors extend perpendicular to the motherboard. Thus, an expansion device that is inserted into such a connector, would be positioned in a perpendicular position with respect to the motherboard. This increases the overall height/spatial volume needed by the motherboard in combination with the expansion device. Other systems may utilize a cable or other expansion connector that allows the expansion device to be positioned parallel with the motherboard, however, these types of connectors require additional cost and, due to the length of the cable and/or connector, may decrease data transfer speeds. In addition, such cables are typically arranged such that the expansion device would be adjacent to, and run parallel to, the motherboard, thus increasing the overall height/spatial volume of the assembly by at least the expansion device and spacing between the expansion device and the motherboard. By configuring a motherboard with expansion connectors along the side (e.g., outer edge(s)), expansion devices may be positioned in a coplanar fashion, which minimizes the overall height/spatial volume of the assembly (e.g., the motherboard and attached expansion devices).

When the motherboard and connecting components (e.g., the expansion devices) are inserted into a rack server bay, the configurations discussed herein with respect to FIG. 4-7 may increase the amount of vertical space available within the rack server bay. For example, a rack server bay may be commonly designated as having a height of 1 U. "1 U" may be the equivalent to 44.45 mm or 1.75 inches high. By positioning the expansion devices in the same plane as the motherboard as discussed below, a greater amount of vertical space may be made available within the rack server bay.

In some examples, the expansion devices may be outfitted or otherwise include heat sinks. A heat sink may be a device or substance utilized to absorb excessive or unwanted heat. Within electrical components, a heat sink may be utilized to transfer the heat generated by the electrical component away from the device, thereby allowing regulation of the device's temperature. Some heat sinks may extend vertically from a printed circuit board (e.g., the expansion device) in a direction that is perpendicular to the printed circuit board of the expansion device so as to transfer heat away from the board. The taller the heat sink, the more effective it may be in reducing heat at the board. By positioning expansion devices in a coplanar fashion with respect to the motherboard as discussed herein, heat sinks positioned on the expansion devices themselves and/or on the motherboard, may be taller than if the expansion device ran parallel to and on top of the motherboard and/or the expansion device extended perpendicular to the motherboard. Thus, use of at least some embodiments of the expansion connectors discussed herein enables taller heat sinks to be utilized to provide more efficient thermal regulation than provided by conventional motherboards utilizing conventional expansion connectors.

FIG. 1 is a block diagram illustrating an example computing system 100 including a printed circuit board (PCB) 102, in accordance with at least one embodiment. FIG. 1 is intended to be a block diagram showing logical relationships between the components PCB 102 rather than how such components are physically arranged relative to each other. The computing system 100 may be an example of general purpose computer, a server computer, or the like. The PCB 102 may be an example of a motherboard utilized to implement the computing system 100. A motherboard may be a computer's central communication backbone connectivity point, through which all components and external peripherals connect. A motherboard may refer to a PCB with expansion connectors that enable additional components to be attached to and utilized by the motherboard and other computing components attached to the motherboard. These additional components (referred throughout as "expansion devices") may include peripheral devices, interface cards, daughtercards, sound cards, video cards, network cards, hard drives or other forms of persistent storage, television tuner cards, cards providing extra USB slots, and a variety of other computing components.

The PCB 102 may include multiple layers of fiberglass, copper connecting traces, and copper planes for power and signal isolation. A power connector (not depicted) may be provided on the PCB 102 that distributes power to the PCB 102 and attached components. PCB 102 may include central processing unit (CPU) 104. The CPU 104 may be general purpose computing device such as are manufactured by Intel Corp., AMD Inc., ARM Holdings, Qualcomm Technologies, Inc., and others. The CPU 104 may be a computing component that is responsible for interpreting and executing commands from a computer's hardware and software components. The CPU 104 may be attached to the PCB 102 via a CPU "socket" (sometimes referred to as a slot) that is situated on the PCB 102. The PCB 102 may include a locking mechanism for locking the CPU into position, which is usually achieved by means of a locking arm. Modern CPUs can produce ample heat. To help dissipate this heat, a heat sink and/or a fan may be positioned on PCB 102 and/or on CPU 104. In some embodiments the PCB 102 may include a baseboard management controller (BMC) or a similar device.

The PCB 102 may include one or more memory slots (e.g., memory slots 106). The memory slots may be connectors that receive various forms of memory modules. The memory slots 106 may receive memory modules that form a system's main memory. The memory modules may include more than one memory and may be distributed throughout the PCB 102. The memory modules may store program instructions that are loadable and executable by the CPU 104, as well as data generated during the execution of these programs. The memory modules may be volatile (such as random access memory (RAM)) and/or non-volatile (such as read-only memory (ROM), flash memory, or other memory). In some implementations, the memory modules may include multiple different types of memory, such as dual inline memory modules (DIMMS) (e.g., Synchronous Dynamic Random-Access Memory (SDRAM), Double Data Rate (DDR), DDR 2, DDR3), Static Random Access Memory (SRAM), Dynamic Random Access Memory (DRAM), Read-Only Memory (ROM), or the like. Some examples of ROM may include Programmable Read-Only Memory (PROM), Erasable Programmable Read-Only Memory (EPROM), Electrically Erasable Programmable Read-Only Memory (EEPROM), and/or Flash EEPROM, among others. The memory modules may store an operating system and one or more application programs, modules or services for implementing various functionality of the components attached to the PCB 102.

The PCB 102 may include one or more PCI slots 108. Each of the PCI slots 108 may be connectors that provide respective interconnects between a PCI compliant device (e.g., a PCI expansion card) and the PCB 102 according to one or more variations of PCI standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. A PCI expansion device may transmit 32 bits at a time in a 124-pin connection or 64 bits in a 188-pin connection. The PCI specifications define two card lengths. The full-size PCI form factor may be 312 millimeters long, while a short PCI form factor ranges from 119-167 millimeters in length. The PCI slots 108 may include a variety of PCI variations such as Compact PCI, Mini PCI, Low-Profile PCI, concurrent PCI, and PCI-X, to name a few.

The PCB 102 may include one or more AGP/PCIe slots 110. Each of the AGP/PCIe slots 110 may be connectors that provide an interconnect (e.g., via a bus) between an AGP or PCIe expansion card and the PCB 102 according to a corresponding AGP or PCIe standard bus protocol. An AGP slot may be a high-speed point-to-point channel for attaching a video card to the PCB 102. An AGP slot may assist in the acceleration of 3D computer graphics. AGP may be heavily based on PCI and, in some cases, the AGP slot is a superset of the convention PCI slot. In some motherboards, of which PCB 102 is an example, PCIe lanes may be run to an area of a face of the motherboard for spatial considerations (e.g., to avoid areas that are utilized by other components of the motherboard such as the CPU, power connector, peripheral connectors, etc.). Utilizing PCIe connectors, data center managers can take advantage of high-speed networking across server backplanes, and connect to gigabit Ethernet, RAID, and Infiniband networking technologies outside of the server rack. The PCIe bus may also interconnect clustered computers that user HyperTransport data transfer technology.

Each of the included PCI slots 108 and/or AGP/PCIe slots 110 may individually receive a peripheral device (otherwise referred to as an expansion device). Peripheral devices can include hardware devices and/or devices that include a combination of hardware and software, which can be attached to a computing system to add functionality to the computing system provided via PCB 102. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the PCB 102 to change the functionality of the system. In some cases, the computing system must be powered down for a peripheral device to be added or removed. In other cases, the peripheral device can be attached or removed while the computer system is powered on (often referred to as "hot-swapping" or "hot-plugging").

Peripheral devices are devices that can generate and/or respond to data transactions. For example, peripheral devices may be "requesters" (transaction generators) and/or "completers" (transaction responders). In PCIe implementations, peripheral devices may include PCIe endpoints, where "endpoint" describes a peripheral device that is configured to communicate using a PCIe protocol. Other peripheral devices may be legacy endpoints, that is, peripheral devices that are configured to communicate using a protocol other than PCIe, such as the original PCI standard or PCI-X. Though not illustrated here, the PCB 102 may further include connectors (e.g., slots) for receiving peripheral devices that implement another bus standard, such as for example, Small Computer System Interface (SCSI), Serial ATA (SATA), or Parallel ATA (PATA), among others.

The PCB 102 may include a northbridge 112 and/or a southbridge 114 that form chip set 116. The northbridge 112 forms an interface between the CPU 104 and the main memory (e.g., connected via memory slots 106) and other components (e.g., peripheral expansion devices) connected to the PCB 102. The northbridge 112 may provide translation from the communication or bus protocol used on the processor bus 118 to the communication protocol used by the peripheral devices (e.g., PCI, PCIe, AGP, etc.). The southbridge 114 may control input and output functions of the computing system 100. In some embodiments, the southbridge 114 may be connected to the CPU indirectly through the northbridge 112. The southbridge 114 may provide a physical interface between input and output devices 120 (e.g., a monitor, speakers, keyboard, etc.) and the PCB 102. The input and output devices 120 may be connected to the PCB 102 via a standard bus. In some embodiments, the functions of the northbridge 112 and/or the southbridge 114 may be integrated as part of the CPU 104.

The PCB 102 may include read-only memory 122. In some embodiments, the read-only memory 122 may contain firmware, or startup instructions for the computing system 100. These instructions may be referred to as the BIOS, or Basic Input Output System. The BIOS provides instructions to the computing system 100 for performing a number of basic functions such as booting and keyboard control. BIOS may also be used to identify and configure the hardware in a computer such as a hard drive, floppy, drive, optical drive, CPU, memory, and the like.

Figure 2:
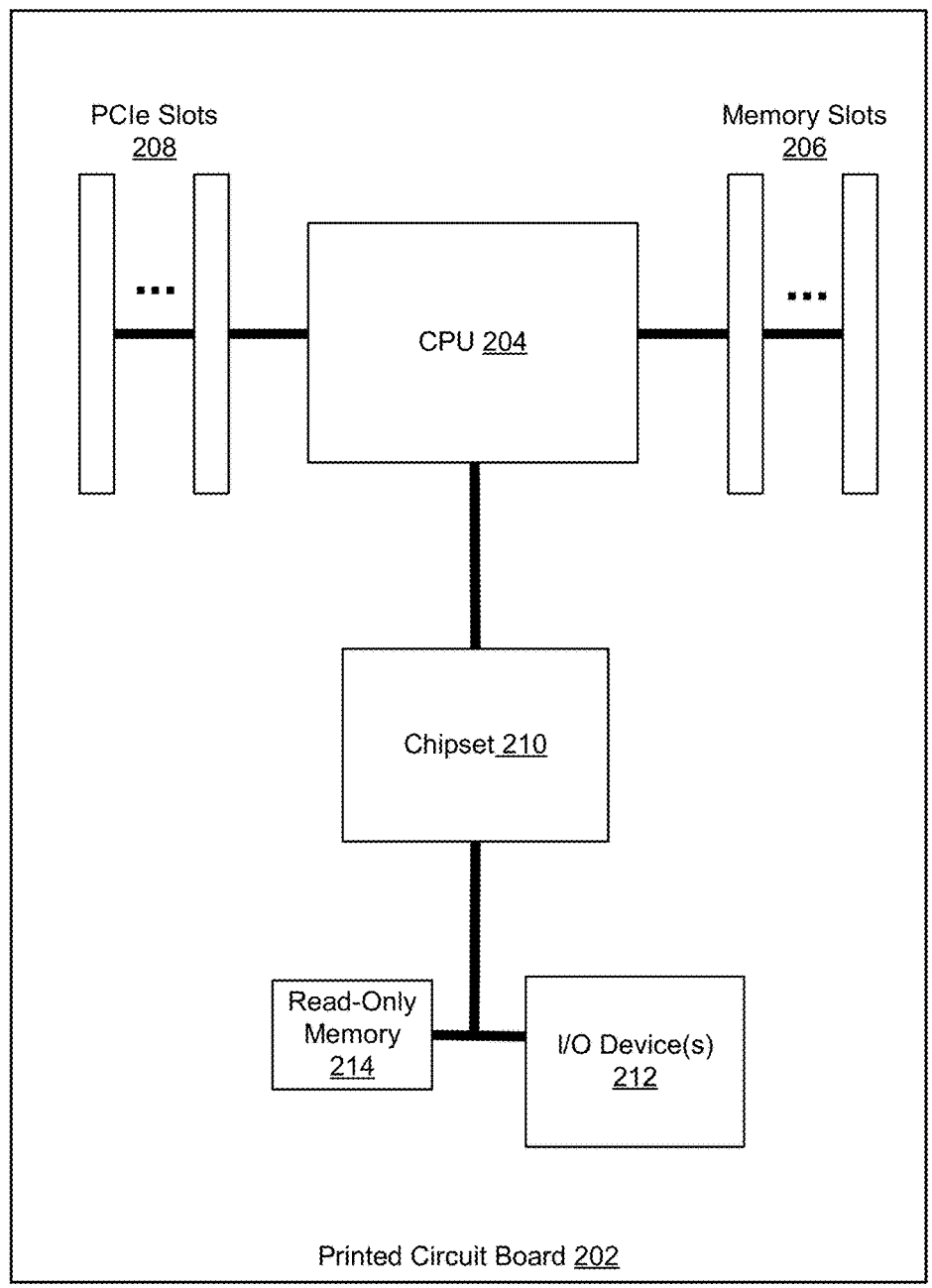
FIG. 2 is a block diagram illustrating another example computing system including a printed circuit board.

FIG. 2 is a block diagram illustrating another example computing system 200 including a printed circuit board (PCB) 202, in accordance with at least one embodiment. FIG. 2 is intended to be a block diagram showing logical relationships between the components PCB 202 rather than how such components are physically arranged relative to each other. The computing system 200 may be an example of general purpose computer, a server computer, or the like. The PCB 202 may be an example of a motherboard utilized to implement the computing system 200.

Like PCB 102 of FIG. 1, the PCB 202 may include multiple layers of fiberglass, copper connecting traces, and copper planes for power and signal isolation. A power connector (not depicted) may be provided on the PCB 202 that distributes power to the PCB 202 and attached components. PCB 202 may include central processing unit (CPU) 204. The CPU 204 may be general purpose computing device such as are manufactured by Intel Corp., AMD Inc., ARM Holdings, Qualcomm Technologies, Inc., and others. The CPU 204 may be a computing component that is responsible for interpreting and executing commands from a computer's hardware and software components. The CPU 204 may be attached to the PCB 202 via a CPU "socket" that is situated on the PCB 202. The PCB 202 may include a locking mechanism for locking the CPU into position. A heat sink and/or a fan may be positioned on PCB 202 and/or on CPU 204. In some embodiments the PCB 202 may include a baseboard management controller (BMC) or a similar device.

The PCB 202 may include one or more memory slots (e.g., memory slots 206) and PCIe slots 208. The memory slots may be connectors that receive various forms of memory modules. The memory slots 206 may receive memory modules that form a system's main memory. The memory modules may include more than one memory and may be distributed throughout the PCB 202. The memory modules may store program instructions that are loadable and executable by the CPU 204, as well as data generated during the execution of these programs. The memory modules may be volatile (such as random access memory (RAM)) and/or non-volatile (such as read-only memory (ROM), flash memory, or other memory). In some implementations, the memory modules may include multiple different types of memory, such as dual inline memory modules (DIMMS) (e.g., Synchronous Dynamic Random-Access Memory (SDRAM), Double Data Rate (DDR), DDR 2, DDR3), Static Random Access Memory (SRAM), Dynamic Random Access Memory (DRAM), Read-Only Memory (ROM), or the like. Some examples of ROM may include Programmable Read-Only Memory (PROM), Erasable Programmable Read-Only Memory (EPROM), Electrically Erasable Programmable Read-Only Memory (EEPROM), and/or Flash EEPROM, among others. The memory modules may store an operating system and one or more application programs, modules or services for implementing various functionality of the components attached to the PCB 202.

Each of the PCIe slots 208 may be connectors that provide respective interconnects between a PCIe compliant device (e.g., a PCIe expansion card) and the PCB 202 according to one or more variations of PCI standard bus protocols. Each of the included PCIe slots 208 may individually receive an expansion device (otherwise referred to as a PCIe expansion device). Expansion devices can include hardware devices and/or devices that include a combination of hardware and software, which can be attached to a computing system to add functionality to the computing system provided via PCB 202. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the PCB 202 to change the functionality of the system. In some cases, the computing system must be powered down for a peripheral device to be added or removed. In other cases, the peripheral device can be attached or removed while the computer system is powered on (often referred to as "hot-swapping" or "hot-plugging").

In some embodiments, the CPU 204 may be communicatively connected to the memory (e.g., memory devices connected via memory slots 106) and other components (e.g., PCIe expansion devices) that are connected (e.g., via the PCIe slots 208) to the PCB 202. The CPU 204 (or some component of the CPU 204) may provide translation from a communication or bus protocol to the communication protocol used by connected expansion devices.

The PCB 202 may include a chipset 210. The chipset 210 may control input and output functions of the computing system 200. In some embodiments, the chipset 210 may provide a physical interface between input and output devices 212 (e.g., a monitor, speakers, keyboard, etc.) and the PCB 202. The input and output devices 212 may be connected to the PCB 202 via a standard bus.

The PCB 202 may include read-only memory 214. In some embodiments, the read-only memory 214 may contain firmware, or startup instructions for the computing system 200. These instructions may be referred to as the BIOS, or Basic Input Output System. The BIOS provides instructions to the computing system 200 for performing a number of basic functions such as booting and keyboard control. BIOS may also be used to identify and configure the hardware in a computer such as a hard drive, floppy, drive, optical drive, CPU, memory, and the like.

Figure 3:
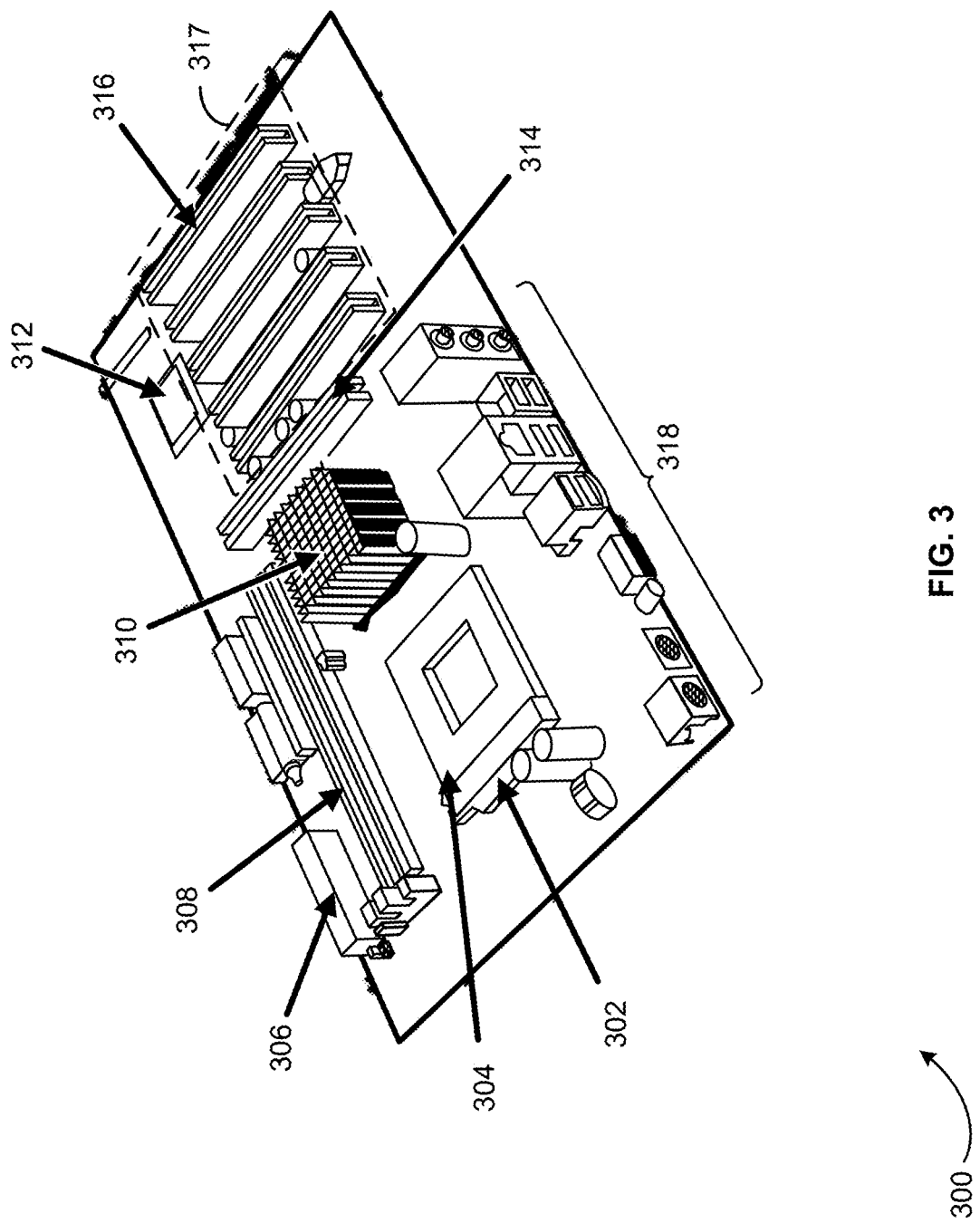
FIG. 3 is a diagram illustrating an exemplary printed circuit board (e.g., a motherboard)

FIG. 3 is a diagram illustrating an exemplary printed circuit board (PCB) 300 (e.g., a motherboard). The PCB 300 may be an example of a motherboard such as the PCB 102 of FIG. 1. The PCB 300 may include a CPU socket 302, a CPU 304, a power connector 306, memory slots 308, a northbridge 310 (with an attached heat sink), a southbridge 312, an AGP slot 314, one or more PCIe slots 316, and various connectors 318 (e.g., audio, Ethernet, serial port, USB, etc.) for peripheral devices, collectively referred to as "the components" of PCB 300.

The CPU socket 302 may attach CPU 304 (e.g., CPU 104 or CPI 204) to the PCB 300 in the manner described above in FIG. 1. The power connector 306 may be situated on PCB 300 in the manner depicted, or the power connector 306 may be differently situation on the PCB 300. The memory slots 308 are intended to depict an example of the memory slots 106 of FIG. 1. As depicted, the memory slots 308 hold a memory device in an orientation that causes the memory device to be positioned perpendicular to the PCB 300. Similarly, the AGP slot 314 and the PCIe slots 316 (together, intended to depict an example of the AGP/PCIe slots 110 of FIG. 1) may position an expansion device in an orientation that causes the expansion device to be positioned perpendicular to the PCB 300. For simplicity, the PCI slots 108 of FIG. 1 are not depicted within PCB 300, but were such slots to be included, they could similarly position an expansion device such that expansion device held perpendicular to the PCB 300. The PCIe slots 316 may be arranged within an area 317 of the PCB 300. The PCB 300 may include any suitable number of connector 318 for connecting any suitable number of peripheral devices (e.g., a monitor, a mouse, a printer, etc.).

It should be appreciated that the PCB 300 is intended to be illustrative in nature. In some cases, the components of PCB 300 may be arranged as depicted in FIG. 3, or the components of PCB 300 may be differently arranged. If the northbridge 310 and southbridge 312 were replaced with a chipset (e.g., the chipset 210 of FIG. 2) and the AGP slot 314 removed, the PCB 300 may appear more similar to the PCB 202 of FIG. 2, another example of a motherboard. Thus, the corresponding components of PCB 202 may be similarly arranged as the corresponding components of FIG. 3, or the components of PCB 202 may be differently arranged. However, the memory slots 206 and the PCIe slots 208 may similarly orient a corresponding memory or expansion device in a perpendicular fashion with respect to the PCB 300.

Figure 4:
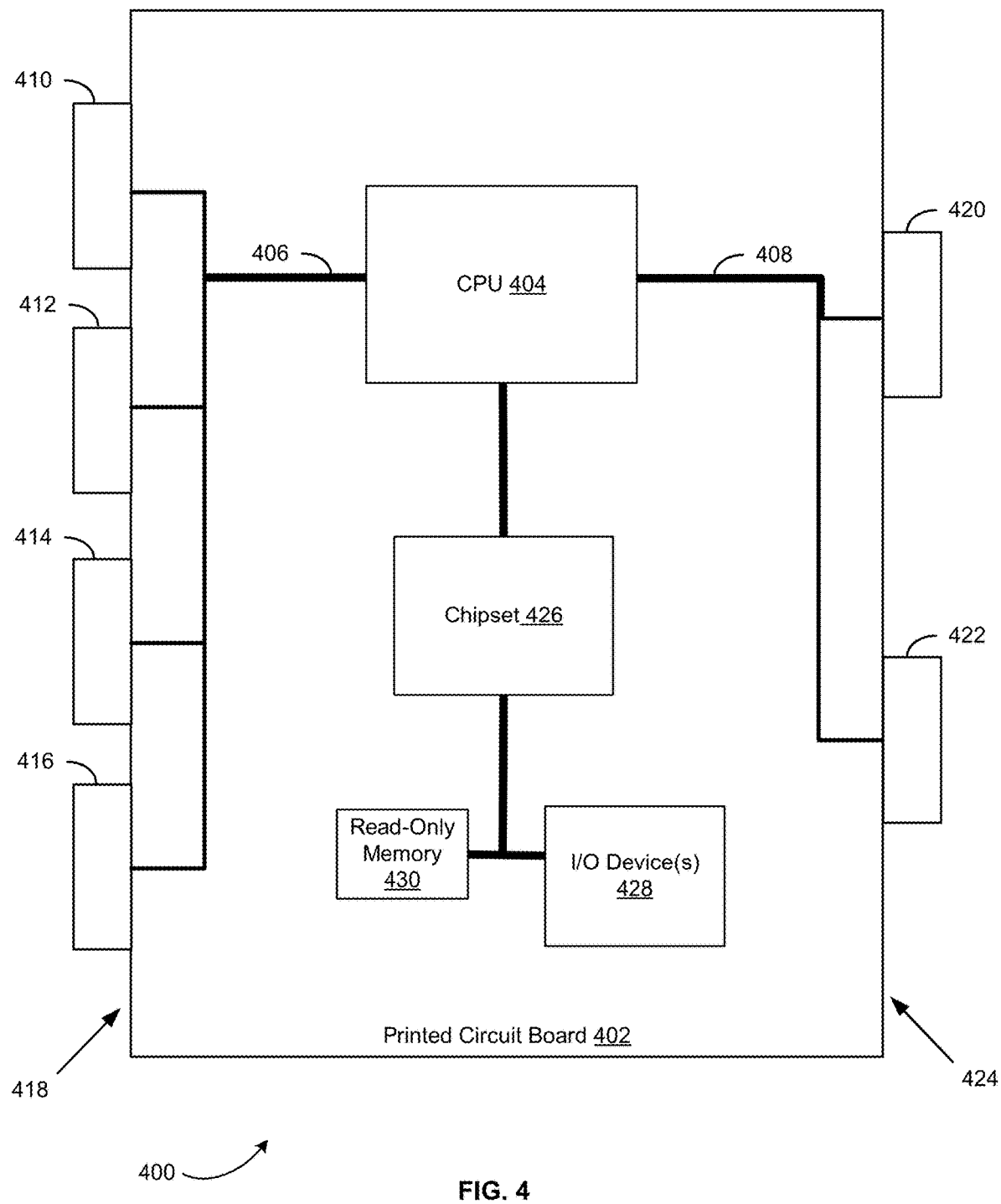
FIG. 4 is a block diagram illustrating an exemplary computing system including a printed circuit board, in accordance with at least one embodiment.

FIG. 4 is a block diagram illustrating an exemplary computing system 400 including a printed circuit board 402, in accordance with at least one embodiment. FIG. 4 is intended to be a block diagram showing logical relationships between the components PCB 402 rather than how such components are physically arranged relative to each other. The computing system 400 may be an example of general purpose computer, a server computer, or the like. The PCB 402 may be an example of a motherboard utilized to implement the computing system 400. The PCB 402, in some embodiments, may include additional components (e.g., memory slots, AGP slots, PCI slots, such as those discussed above in connection with FIGS. 1 and 2). These additional components are not depicted here for the sake of simplicity.

Like the PCBs discussed above, PCB 402 may include multiple layers of fiberglass, copper connecting traces, and copper planes for power and signal isolation. A power connector (not depicted) may be provided on the PCB 402 that distributes power to the PCB 402 and attached components. PCB 402 may include central processing unit (CPU) 404 (e.g., attached via a CPU socket). The CPU 404 may be general purpose computing device such as are manufactured by Intel Corp., AMD Inc., ARM Holdings, Qualcomm Technologies, Inc., and others. PCB 402 and/or on CPU 404. In some embodiments the PCB 402 may include a baseboard management controller (BMC) or a similar device.

PCB 402 may be manufactured to include PCIe lanes 406 and PCIe lanes 408. The PCIe lanes 406 may connect the CPU to expansion connectors 410, 412, 414, and 416 that are individually attached (e.g., via a straddle mount or other mount) to or near a first outer edge (e.g., edge 418) of the PCB 402. The PCIe lanes 408 may connect the CPU 404 to expansion connectors 420 and 420 that are individually attached (e.g., via a straddle mount or other mount) to or near a second outer edge (e.g., edge 424) of the PCB 402. Each of the expansion connectors of FIG. 4 may provide respective interconnects between a PCIe compliant device (e.g., a PCIe expansion card) and the PCB 402 according to one or more variations of PCI standard bus protocols. In various embodiments, the lanes 406 and 408 can be of equal or different number. Thus, in some embodiments the edges 418, 424 may have different numbers of lanes available for connectors.

It should be appreciated that the particular number of expansion connectors depicted in FIG. 4 as being attached to edge 418 or edge 424 is intended to be illustrative in nature. It is contemplated that any suitable number of expansion connectors may be utilized on either edge and/or on additional edges of the PCB 400 (e.g., on more than two edges of the PCB 400). The expansion connectors of PCB 402 may be arranged as depicted in FIG. 4 or the expansion connectors may be differently arranged. For example, although the expansion connectors of FIG. 4 are relatively evenly spaced along a corresponding edge of the PCB 402, it is contemplated that the expansion connectors may instead be staggered across the attached edge. Thus, the distance between connectors may be consistent or the distance between connectors may vary. In some embodiments, one or more of the connectors attached to edge 418 may be the same type (e.g., utilizing a same number of PCIe lanes) as one or more of the connectors of the edge 424, or one or more of the connectors attached to edge 418 may be a different type (e.g., utilizing a different number of PCIe lanes) as one or more of the connectors of the edge 424. The PCIe lanes 406 and the PCIe lanes 408 may be arranged as depicted in FIG. 4, or they may be differently arranged to connect the CPI 404 to the various expansion connectors of FIG. 4.

The PCB 402 may include a chipset 426. The chipset 426 may control input and output functions of the computing system 400. In some embodiments, the chipset 426 may provide a physical interface between input and output devices 428 (e.g., a monitor, speakers, keyboard, etc.) and the PCB 402. The input and output devices 428 may be connected to the PCB 402 via a standard bus. The PCB 202 may additionally include read-only memory 430. In some embodiments, the read-only memory 430 may contain firmware, or startup instructions for the computing system 400.

Figure 5:
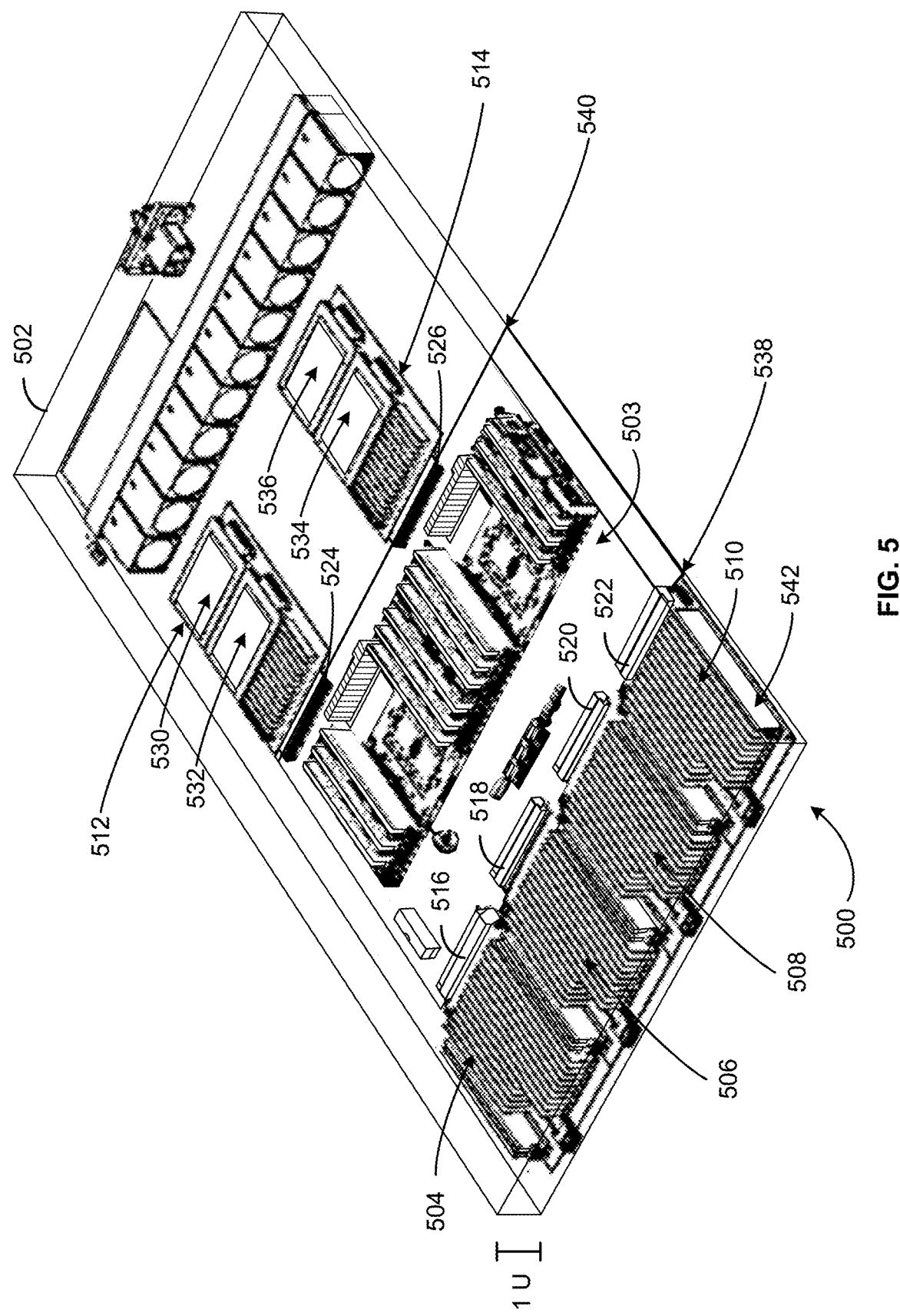
FIG. 5 is a top, angular view of an example a computing system (e.g., a computing system similar to that of FIG. 4) as housed in a rack server bay in a first orientation, in accordance with at least one embodiment.

FIG. 5 is a top, angular view of a computing system 500 (e.g., a computing system similar to computing system 400 of FIG. 4) as housed in a rack server bay 502 in a first orientation, in accordance with at least one embodiment. The rack server bay 502 may be a compartment for housing a computing system (e.g., the computing system 500) that may be any suitable dimensions. In some embodiments, the rack server bay 502 may have a height of 1 U/44.45 mm/1.75 inches. The computing system 500, including the PCB 503 and various connected expansion devices (e.g., expansion devices 504, 506, 508, 510, 512, and 514), may be placed (e.g., mounted) within the rack server bay 502. In accordance with at least one embodiment, the PCB 503 may include any suitable number of expansion connectors (e.g., such as the expansion connectors 410-422 of FIG. 4). In the example depicted, the PCB 503 includes six expansion connectors (e.g., expansion connectors 516, 518, 520, 522, 524, and 526), although any suitable number of expansion connectors may be utilized. Expansion connectors 516-522 may receive expansion devices 504-510, respectively. Expansion devices 504-510 are intended to depict example expansion cards that include a system-on-chip for providing additional functionality. The expansion devices 504-510 may include respective heat sinks (e.g., heat sink 528) for transferring heat produced by the expansion device away from the PCB of the expansion device. The expansion devices 512 and 514 may also be utilized to extend functionality of the PCB 503 and may also individually include one or more respective heat sinks. The expansion devices 512 and 514 are intended to depict expansion cards that include solid-state drives (SSDs). For example, expansion device 512 may include SSD 530 and SSD 532, while expansion device 514 may include SSD 534 and SSD 536. The expansion devices 504-514 are intended to be illustrative in nature and are not intended to limit the scope of this disclosure. Any suitable expansion device discussed herein may be similarly utilized.

In some embodiments, the expansion connectors 516-522 may be attached (e.g., via a straddle mount) to one outer edge, or side (e.g., side 538), of the PCB 503, while the expansion connectors 524 and 526 may be attached (e.g., via a straddle mount) to a second outer edge, or side (e.g., the side 540), of the PCB 503 as depicted in FIG. 5. However, it should be appreciated that any suitable number of expansion connectors may be attached the side 538 and/or the side 540. The expansion connectors 516-526 may communicatively connect the corresponding expansion devices 504-514 to the PCB 503 (and/or a CPU of the PCB 503 such as the CPU 404 of FIG. 4. Thus, the expansion connectors 516-526 may provide access to the expansion devices 502-514 by the CPU and/or memory of the PCB 503. Each of the expansion connectors 516-526 may be positioned to connect a corresponding expansion device such as to align the expansion device in a same plane (or substantially the same plane) as the PCB 503. These expansion connectors provide an improvement over connectors that utilizing expansion connectors that position expansion devices in a perpendicular fashion with respect to a PCB. By placing the expansion connectors to the sides and configuring them to receive expansion devices in the manner described, the expansion connectors 516-526 allow the combined PCB 503 and the expansion devices 504-514 to take up less overall height than some other systems. Accordingly, the PCB 503 and attached expansion devices 504-514 may be placed in the rack server bay 502 utilizing less vertical space than realized in some other systems. For example, the embodiment depicted in FIG. 5 allows all components of the computing system 502, including the expansion devices, to fit within a height dimension of 1U. Additionally, the expansion connectors 516-526 enable the expansion devices to be distributed throughout the rack server bay 502 in a manner that may be advantageous for thermal regulations of the expansion devices. By way of example only, the expansion devices 512 and 514 may be more resistant to higher ambient temperatures than the expansion devices 504-510. Thus, arranging expansion devices 512 and 514 toward the back of the rack server bay 502 may be advantageous as the expansion devices 504-510 may be more susceptible to thermal damage.

In some embodiments, as a result of utilization of expansion connectors 516-526, a number of heat sinks may be provided on the expansion devices 504-514. As a non-limiting example, the heat sink 542 may be provided on expansion device 510 in order to transfer heat away from the PCB of the expansion device 510. The increased vertical space within the rack server bay 500 realized through the utilization of the expansion connectors 516-526 may enable any suitable heat sink (e.g., the heat sink 542) of the expansion devices 504-514 and/or any heat sinks attached to the PCB 503 to be taller in height than heat sinks previously provided in some other systems. This may be because, in some systems, heat sink height may be limited given the distance between perpendicularly positioned expansion cards. Expansion cards that are positioned adjacent and parallel to a motherboard may increase the height of the assembly and, thus, limit the available vertical space within a rack server bay. By utilizing the expansion connectors 516-526, an increased height capability may be achieved. Utilizing the increased height capability (e.g., the additional vertical space within the rack server bay 500) to provide heat sinks may enable the heat sinks included in the computing system 502 to provide more efficient thermal regulation of the expansion devices 504-514. Similarly, any heat sink utilized on PCB 503 (or another component of computing system 500) may be similarly provided such that the heat sink of the PCB 503 (or the other component of computing system 500) provides more efficient thermal regulation of the PCB 503 (or the other component of computing system 500).

Although the configuration of the computing system of FIG. 5 includes a particular number and configuration of the expansion connectors 516-526 and expansion devices 504-514, it should be appreciated that the number and configuration of expansion devices/connectors may be utilized. By way of example, the side 540 may include two expansion connectors and the side 538 may include three expansion connectors, each configured to receive an expansion device. The number of expansion connectors may be equal with respect to the side 538 and the side 540, or the number of expansion connectors may differ between the side 538 and the side 540. In some embodiments, the side 538 and the side 540 may be opposing one another as depicted, or the side 538 and the side 540 may be adjacent to one another. In still further examples, the PCB 503 may include one or more expansion connectors on any suitable number of sides (e.g., one, or more than one, or all). The expansion connectors on one side may be the same type (e.g., utilizing a same number of PCIe lanes) as the connectors of another side, or the expansion connectors on one side may be a different type (e.g., utilizing a different number of PCIe lanes) as the connectors of the other side.

Figure 6A:
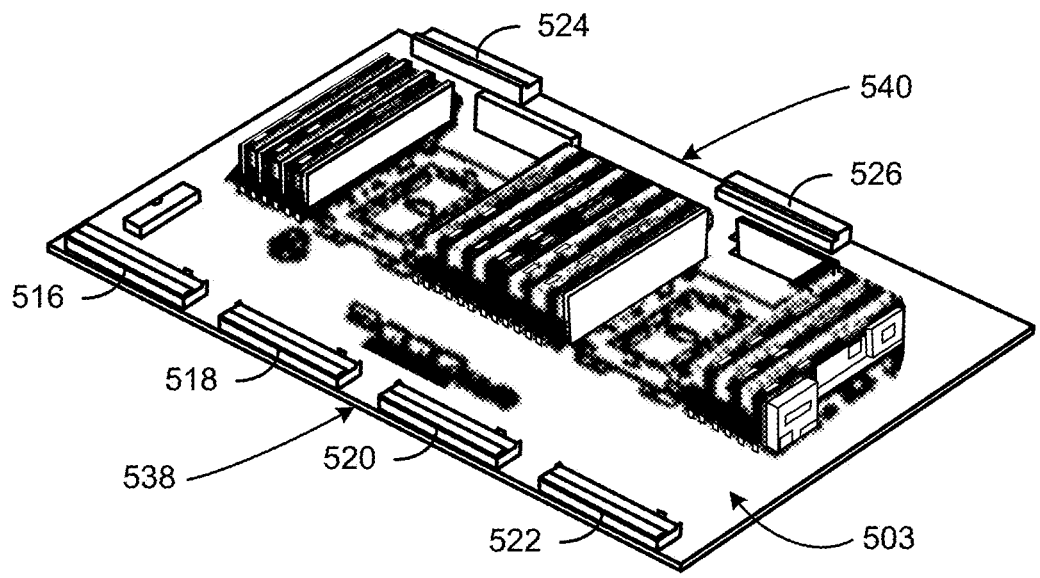
FIGS. 6A and 6B individually depict top, angular views of the printed circuit board similar to that of FIG. 4, including a number of expansion card connectors, in accordance with at least one embodiment.
Figure 6B:
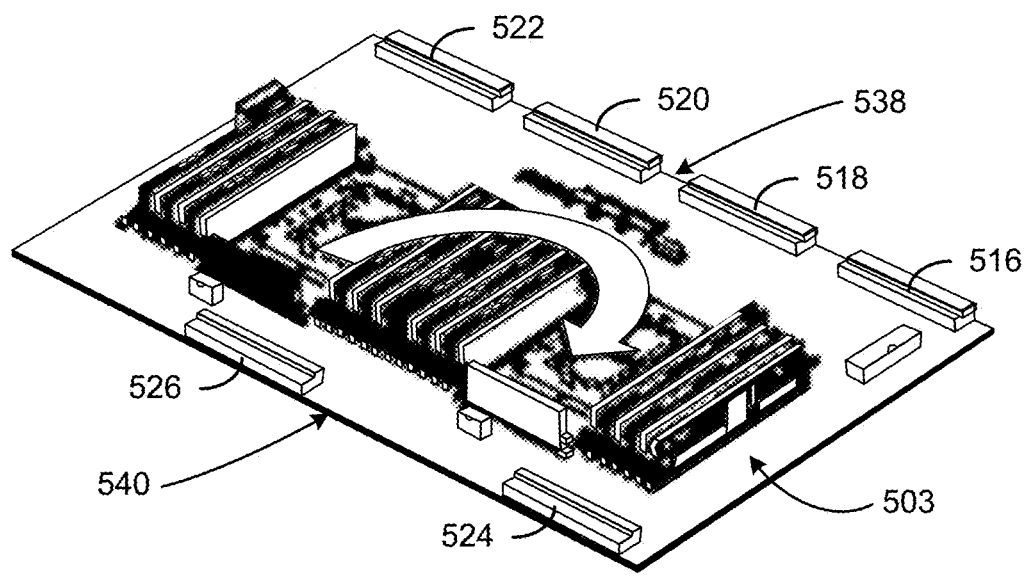

FIGS. 6A and 6B depict top, angular views of PCB 503 of FIG. 5, including a number of expansion card connectors, in accordance with at least one embodiment. FIG. 6A is intended to depict a positioning similar to the one depicted in FIG. 5, where the side 538 of the PCB 503 faces the "front" of the rack server bay 502, and where the side 540 of the PCB 503 faces the "back" of the rack server bay 500. The terms "front" and "back" are intended to be relative terms and are used to describe opposing sides of the rack server bay 502.

As a result of having PCIe lanes that run to connectors on opposing sides of the PCB 503, the PCB 503 may be rotated 180 degrees within the rack server bay 502 to be positioned as depicted in FIG. 6B. That is, the side 538 may be faced toward the "back" of the rack server bay 502, while the side 540 is faced toward the "front" of the rack server bay 502. Thus, the expansion connectors 516-522 may be positioned to face the front of the rack server bay 502, while the connectors 524 and 526 are positioned to face the back of the rack server bay 502, or vice versa. Accordingly, rotating the PCB 503 to achieve the configurations depicted in FIG. 6A and FIG. 6B may provide a greater number of potential configurations of the expansion devices attached to the PCB 503 with the rack server bay 500 of FIG. 5. Based on the individual configurations of the PCB 503 and of the server bay 502, in some embodiments it is possible to rotate the PCB 503 by a number of degrees other than 180 degrees (e.g., by 90 degrees).

Figure 7:
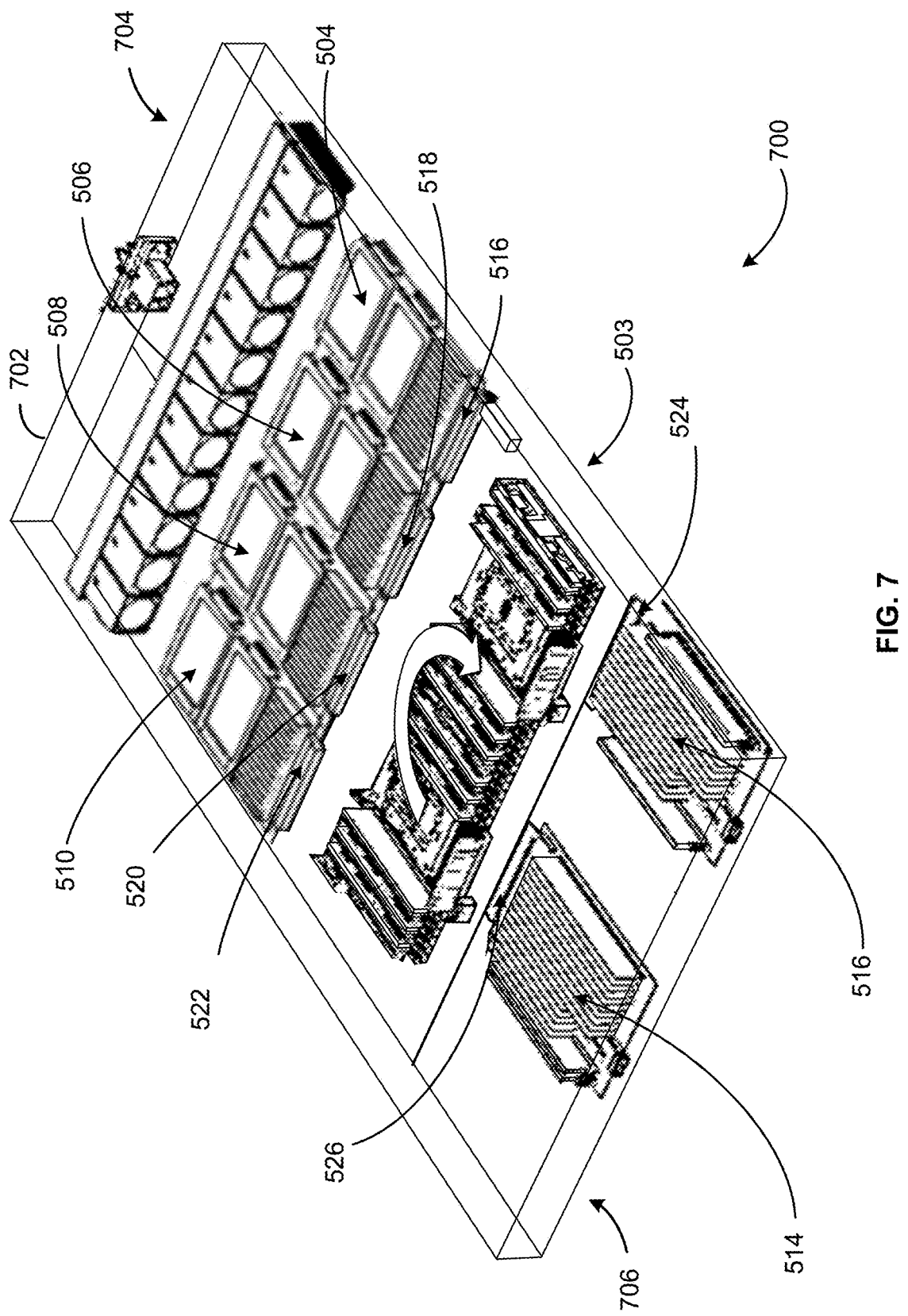
FIG. 7 is another angular view of a computing system (e.g., a computing system similar to that of FIG. 4) as housed in a rack server bay in a second orientation, in accordance with at least one embodiment.

FIG. 7 is a top, angular view of a computing system 700 (e.g., the computing system 500 of FIG. 5) as housed in a rack server bay 702 (e.g., the rack server bay 502 of FIG. 5) in a second orientation. FIG. 7 is intended to depict a computing system 500 as housed in the rack server bay 702 after the PCB 503 of FIG. 5 is rotated 180 degrees, such as is shown in FIG. 6B. The PCB 503, as depicted in FIG. 7, may be positioned to face the expansion connectors 516, 518, 520, and 522 toward the back of the rack server bay 702 in a similar configuration as depicted in FIG. 6B. By rotating the PCB 503 to enable to different orientations of the PCB 503 within the rack server bay 702, additional expansion device positions may be obtained. By way of example, a larger number of expansion devices (e.g., the expansion cards 504, 506, 508, and 510) of the PCB 503 may be positioned toward the back 704 of the rack server bay 702 rather than toward the front 706 of the rack server bay 702 as depicted in FIG. 5.

Expansion devices may have varying thermal properties. For example, the expansion cards 514 and 516 may individually produce more heat than each of the expansion cards 504-510. It may be the case that there is greater air flow or potential air flow toward the front 706 of the rack server bay 702. By rotating the PCB 503, the greater heat producing cards (e.g., expansion cards 514 and 516) may be positioned toward a side (e.g., front 706) of the rack server bay 702 where the greater air flow may be beneficial in aiding in the thermal regulation of expansion cards 514 and 516.

Another potential advantage to rotating PCB 503 is that particular cards may be positioned toward an accessible/more accessible side of the rack server bay 702 (e.g., the front 706) for easy access. In may be the case that the expansion cards 504, 506, 508, and 510 are intended to remain attached to the PCB 503 for an extended period of time, or at least are unlikely to be removed from the PCB 503 before the expansion cards 514 and 516. Thus, the PCB 503 may be positioned as depicted in FIG. 7, which positions the expansion cards 514 and 516 toward an accessible side (e.g., the front 706) of the rack server bay 702. Thus, the expansion card 514 and 516 may easily be removed and additional cards may utilize the expansion connectors 518 and 520.

Figure 8:
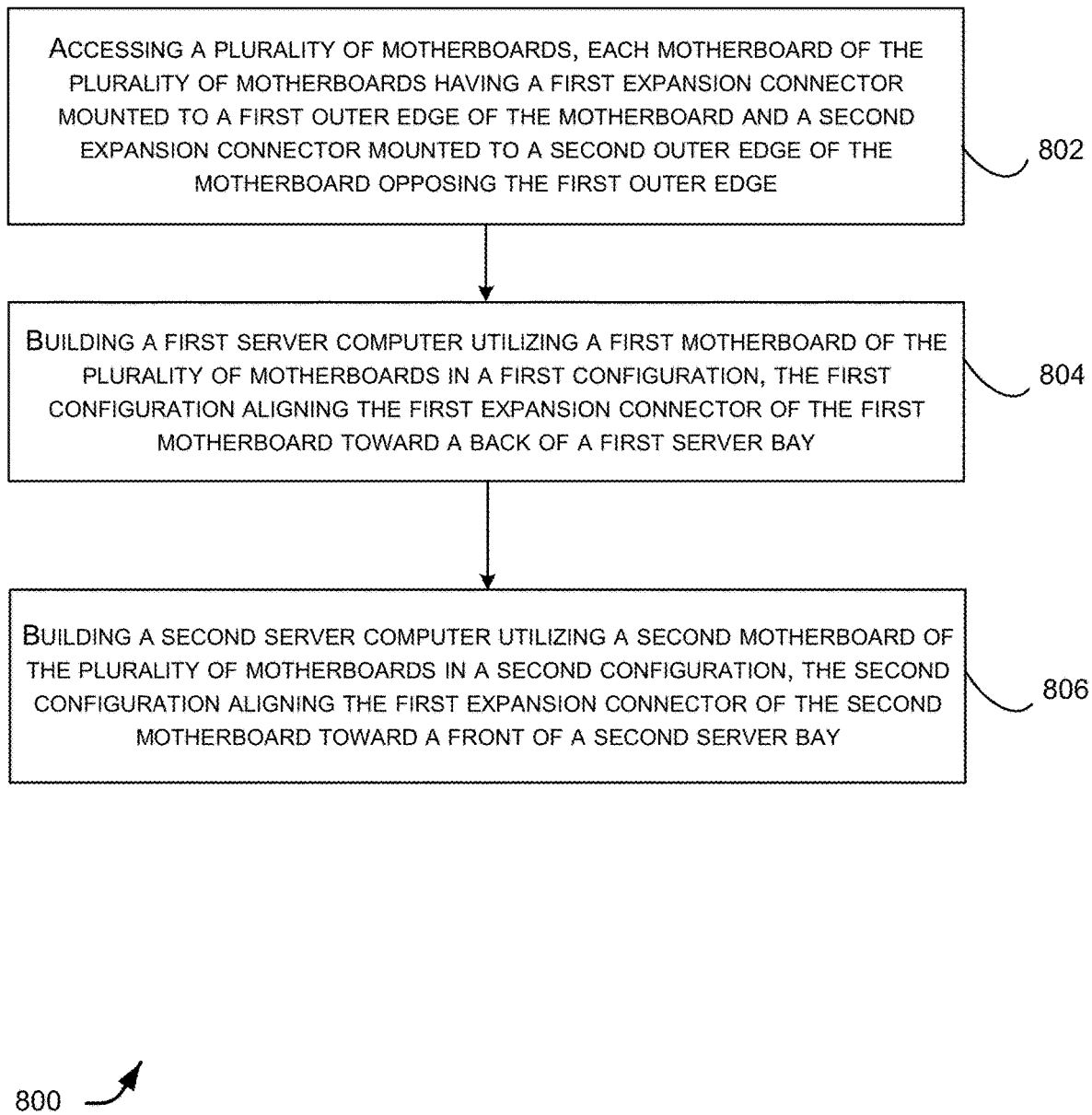
FIG. 8 is a flowchart illustrating an example method, in accordance with at least one embodiment.

FIG. 8 is a flowchart illustrating an example method 800, in accordance with at least one embodiment. The steps of method 800 may performed in any suitable order. It should be appreciated that some embodiments of the method 800 may include a greater or lesser number of steps than the number of steps depicted in FIG. 8.

The method may begin at 802, where a plurality of motherboards (e.g., any suitable number of the PCB 404 of FIG. 4 and/or PCB 503 of FIG. 5) may be accessed. Each motherboard may have a first expansion connector mounted to a first outer edge of the motherboard (e.g., as depicted by expansion connector 410 of FIG. 4 and, for example, expansion connector 516 of FIG. 5) and a second expansion connector mounted to a second outer edge of the motherboard opposing the first outer edge (e.g., as depicted by expansion connector 420 of FIG. 4 and, for example, expansion connector 524 of FIG. 5). In some embodiments, a first set of PCIe lanes may connect a CPU of the motherboard (e.g., the CPU 404 of FIG. 4) to first expansion connector (e.g., expansion connectors 410 of FIG. 4) attached to the first outer edge (e.g., edge 418 of FIG. 4) of the motherboard (e.g., PCB 402 of FIG. 4). A second set of PCIe lanes may connect the CPU of the motherboard to a second expansion connector (e.g., expansion connectors 420 of FIG. 4) that are attached to the second outer edge (e.g., edge 424 of FIG. 4) of the motherboard. The first expansion connector of the motherboard may include any suitable type of expansion connector. Similarly, the second expansion connector may include any suitable type of expansion connector that may be the same or different from the connector type of the first expansion connector.

At 804, a first server computer may be built utilizing a first motherboard of the plurality of motherboards in a first configuration. The first configuration may align the first expansion connector (e.g., expansion connector 516) of the first motherboard toward a back of a first server bay (e.g., the rack server bay 702 of FIG. 7). Illustrations of the first configuration can be found in FIGS. 6B and 7. Once built, the first server computer may be placed in the server bay such that the first motherboard is in the first configuration within the first server bay (e.g., as depicted in FIG. 7).

At 806, a second server computer may be built utilizing a second motherboard of the plurality of motherboards in a second configuration. The second configuration may align the first expansion connector (e.g., expansion connector 516) of the second motherboard toward a front of a second server bay (e.g., the rack server bay 502 of FIG. 5). Illustrations of the second configuration can be found in FIGS. 5 and 6A. Once built, the second server computer may be placed in the server bay such that the motherboard is in the second configuration within the second server bay (e.g., as depicted in FIG. 5).

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A motherboard, comprising:
   first and second outer edges;
   third and fourth outer edges that together with the first and second outer edges define a rectangular area, with the first outer edge and the second outer edge being opposite each other in the rectangular area and the third outer edge and the fourth outer edge being opposite each other in the rectangular area;
   a first set of peripheral component interconnect express (PCIe) connectors mounted at the first outer edge of the motherboard;
   a second set of PCIe connectors mounted at the second outer edge of the motherboard, wherein the motherboard is configured to be positioned in a rack server bay in either of two positions, wherein in a first position of the two positions the first set of PCIe connectors is at a front of the rack server bay, and in a second position of the two positions the second set of PCIe connectors is at the front of the rack server bay, wherein the first set of PCIe connectors and the second set of PCIe connectors each comprise a respective slot aligned in a same plane as the motherboard and configured to directly connect with an expansion device; and
   a first expansion device directly connected to a first PCIe connector of the first set of PCIe connectors, the first expansion device being aligned in the same plane as the motherboard by virtue of being directly connected to the first PCIe connector.

2. The motherboard of claim 1, wherein the first expansion device being aligned by the first PCIe connector to be in the same plane as the motherboard causes a total height of the motherboard and the first expansion device to be under a threshold height.

3. The motherboard of claim 1, wherein the first set of PCIe connectors is more numerous than the second set of PCIe connectors.

4. An apparatus, comprising:
   a printed circuit board (PCB) comprising:
      first and second edges; and
      third and fourth edges that together with the first and second edges define a rectangular area, with the first edge and the second edge being opposite each other in the rectangular area and the third edge and the fourth edge being opposite each other in the rectangular area;

a first expansion card connector mounted at the first edge of the PCB, the first expansion card connector comprising a first slot aligned in a same plane as the PCB and configured to directly connect with a first expansion device; and a second expansion card connector mounted at the second edge of the PCB, the second expansion card connector comprising a second slot aligned in the same plane as the PCB and configured to directly connect with a second expansion device.

5. The apparatus of claim 4, wherein the printed circuit board is configured to be positioned within a rack server bay in two different orientations relative to the rack server bay.

6. The apparatus of claim 5, wherein the two different orientations of the printed circuit board are rotated 180 degrees from one another.

7. The apparatus of claim 4, wherein the first and second expansion card connectors are PCIe connectors.

8. The apparatus of claim 7, further comprising:
on the printed circuit board, a larger number of PCIe lanes connected to the first edge; and
on the printed circuit board, a smaller number of PCIe lanes connected to the second edge.

9. The apparatus of claim 4, wherein the first and second expansion card connectors are different types of expansion card connectors.

10. A method, comprising:
receiving a first and a second instance of a motherboard, the motherboard comprising:
first and second outer edges;
third and fourth outer edges that together with the first and second outer edges define a rectangular area, with the first outer edge and the second outer edge being opposite each other in the rectangular area and the third outer edge and the fourth outer edge being opposite each other in the rectangular area;
a first expansion connector mounted to the first outer edge; and
a second expansion connector mounted to the second outer edge, the first and second expansion connectors each comprising a respective slot aligned in a same plane as the motherboard and configured to directly connect with a respective expansion device;
building a first server computer comprising a first server bay with the first instance of the motherboard in a first orientation, the first orientation aligning the first expansion connector of the first instance of the motherboard toward a back of the first server bay; and
building a second server computer comprising a second server bay with the second instance of the motherboard in a second orientation, the second orientation aligning the first expansion connector of the second instance of the motherboard toward a front of the second server bay.

11. The method of claim 10, wherein each of the first and second instances of the motherboard comprises:

a first set of PCIe lanes that run to the first outer edge, the first set of PCIe lanes connecting a CPU socket of the motherboard to the first expansion connector; and
a second set of PCIe lanes that run to the second out edge that opposes the first out edge, the second set of PCIe lanes connecting the CPU socket of the motherboard to the second expansion connector.

12. The method of claim 10, wherein each of the first and second instances of the motherboard comprises an additional expansion connector mounted to the first outer edge of the motherboard, such that the first outer edge of the motherboard comprises more expansion connectors than the second outer edge of the motherboard.

13. The method of claim 10, wherein the first expansion connector is configured to connect to a first type of expansion device and the second expansion connector is configured to connect to a second type of expansion device, the first type of expansion device being different than the second type of expansion device.

14. The method of claim 13, further comprising:
connecting a first expansion device to the first expansion connector of the first instance of the motherboard; and
connecting a second expansion device to the second expansion connector of the first instance of the motherboard.

15. The method of claim 14, wherein connecting the first expansion device connected to the first outer edge of the first instance of the motherboard and the second expansion device connected to the second outer edge of the first instance of the motherboard causes a combined height of the first instance of the motherboard, the first expansion device, and the second expansion device to be equal to or less than a threshold height associated with the first server bay.

16. The method of claim 10, wherein the first and second server computers allow for different amounts or patterns of airflow around their respective motherboards.

17. The motherboard of claim 2, wherein directly connecting the first expansion device to the first PCIe connector decreases a speed at which data is transferred between the motherboard and the first expansion device than if the first expansion device was otherwise connected to the motherboard.

18. The motherboard of claim 1, wherein individual PCIe connectors of the first set of PCIe connectors have first elongated profiles and are mounted such that first elongated profiles are aligned with the first outer edge of the motherboard, and wherein individual PCIe connectors of the second set of PCIe connectors have second elongated profiles and are mounted such that the second elongated profiles are aligned with the second outer edge of the motherboard.

19. The apparatus of claim 4, wherein the first expansion card connector comprises a first elongated profile and is mounted such that the first elongate profile is aligned with the first edge, and wherein the second expansion card connector comprises a second elongated profile and is mounted such that the second elongate profile is aligned with the second edge.

* * * * *